United States Patent [19]
Schuler et al.

[11] Patent Number: 5,415,767
[45] Date of Patent: May 16, 1995

[54] WATER TREATMENT PLANT

[75] Inventors: Hansjörg Schuler, Backnang; Ralf Söcknick, Kornwestheim, all of Germany

[73] Assignee: Judo Wasseraufbereitung GmbH, Winnenden, Germany

[21] Appl. No.: 41,668

[22] Filed: Apr. 1, 1993

[30] Foreign Application Priority Data

May 28, 1992 [DE] Germany .................. 42 17 652.2
Mar. 4, 1993 [EP] European Pat. Off. ......... 93103436

[51] Int. Cl.6 ............................................. B01J 47/14
[52] U.S. Cl. ...................................................... 210/191
[58] Field of Search .................. 210/88, 98, 190, 191, 210/269

[56] References Cited

U.S. PATENT DOCUMENTS

| | | | |
|---|---|---|---|
| 3,414,130 | 12/1968 | Berzups | 210/97 |
| 3,476,247 | 11/1969 | Rose | 210/95 |
| 3,509,998 | 5/1970 | Pellett et al. | 210/98 |
| 3,891,552 | 6/1975 | Prior | 210/98 |
| 4,298,025 | 11/1981 | Prior et al. | 210/190 |
| 4,421,652 | 12/1983 | Heskett | 210/687 |

FOREIGN PATENT DOCUMENTS

| | | |
|---|---|---|
| 0031535 | 7/1981 | European Pat. Off. |
| 0184773 | 12/1985 | European Pat. Off. |
| 0219704 | 4/1987 | European Pat. Off. |
| 0347577 | 5/1989 | European Pat. Off. |
| 0447350 | 3/1991 | European Pat. Off. |
| 2107204 | 5/1972 | France |
| 2408337 | 6/1979 | France |
| 2644759 | 10/1976 | Germany |
| 2652113 | 11/1976 | Germany |
| 2655374 | 12/1976 | Germany |
| 3506042 | 2/1985 | Germany |

OTHER PUBLICATIONS

Prospect from JUDO Wasseraufbereitung "Maβ-gebend in der Wasseraufbereitung" pp. 22, 23.

Primary Examiner—Ivars Cintins
Attorney, Agent, or Firm—Palmatier & Zummer

[57] ABSTRACT

In a device for the treatment of water with a supply container for the provision of a regeneration agent solution and also with a piston-stroke controlled metering device for the allotting of feed-water into the supply container, wherein the exactly defined water volume which is displaced with one piston stroke can be supplied to the supply container as feed-water, the piston (5) carries at one of its axial ends a connecting rod (6) which engages tangentially in a toothed wheel (8) and can turn the latter by a certain angle α a defined by the piston stroke and the number of teeth of the toothed wheel (8) in a determined constant direction of rotation, wherein the toothed wheel (8) drives a mechanical valve control element with cyclic control program course, as for example a camshaft, a cam plate or the like. In this manner, a volume-true fluid metering device and at the same time an inexpensive stepping motor are provided for cyclic control functions by means of one single element with a mechanically simple construction, i.e. the delivery body, which contains the piston (5) with the connecting rod (6).

22 Claims, 6 Drawing Sheets

WATER TREATMENT PLANT

BACKGROUND OF THE INVENTION

The invention relates to a device for the treatment of water, in particular an ion exchange device for the treatment of domestic water, with means for the treatment of water, in particular an ion exchanger material with a supply container for providing a regeneration agent solution for the regeneration of the means for water treatment, in particular a brine supply container, as well as with a piston-stroke controlled metering device for the allotting of feed-water into the supply container, wherein the metering device comprises a hollow cylindrical delivery body which contains a piston which is axially displaceable and one axial surface of which faces a pressure area within the cylinder, which can be acted upon with water pressure, preferably of the water to be treated or the water which has already been treated, whereas the piston is forced in the direction of the pressure area on the side axially opposite to the pressurized area by means of a spring element, in particular a helical spring, which is supported by an end-faced inner wall of the cylinder and wherein the water volume which is displaced with a piston stroke can be fed to the supply container.

Such a device is known from DE 26 55 374 A1.

Plants or devices for the treatment of water which require a multitude of valve control processes, are driven in different ways depending on their size. Big plants, which are used for example in the industrial field, are usually equipped with a multitude of magnetic valves and have an electronic system handling the valve control program. Magnetic valves of this type are frequently too expensive for relatively small water treatment devices which are used in domestic water technology—i.e. mainly ion exchangers, however also neutralization, deferrization or demanganization filters etc. are feasible. Thus, one usually goes back to a control camshaft driven by an electromotor (see leaflet "MaBgebend in der Wasseraufbereitung" by the company JUDO Wasseraufbereitung GmbH, 01/1992, page 22) or a control cam plate, as it is known from EP 0 447 350 A2 and respectively a ceramic disc pair, known from EP 0 184 773 A2 which contains the control valves.

The electromotors used in this case, however, are relatively expensive since they have to be very robust. A further problem lies therein, to always position the control camshaft or a further control element correctly via the motor rotation, such that the right valves are opened and respectively closed at the right point in time. This can be realised for example by means of an electronically controlled stepping motor or via a positioning switch. But both possibilities are expensive. As an alternative to the electrical drive of the control elements, a drive by means of water power is possible which is considerably less expensive. For example, from U.S. Pat. No. 3,891,552, a water meter with an impeller as drive for the valve control is known, in which the mechanical control of the valve(s) is performed via the water power by means of pressurized water. A disadvantage is the expensive gear transmission for the water meter which is necessary for this valve control. A further disadvantage is the long reaction time of the water meter caused by the loss of energy due to the drive, which is approximately 150 liters per hour, whereas a conventional water meter without drive function reacts at approximately 30 liters per hour.

A further problem with the known plants for the treatment of water is the exact allotting of the regeneration agent amount. According to EP 0 347 577 B1 the measuring of the regeneration agent is performed for example via a float switch. In a method according to the above-mentioned leaflet of the company JUDO (pages 22 and 23) which is further improved thereto, fresh water is guided via the salt supply, where the fresh water becomes saturated with the regeneration salt and flows via an overflow weir into the brine provision container. Therein, it is presented for regeneration. The regeneration solution continues to flow via this weir until the floating body has reached the upper switching point of the float switch and the latter then closes the fresh water feeding valve. In this manner, a certain regeneration agent volume is metered. This method, however, has two weak points: Firstly, regeneration salt crusts may impair the mobility of the floating body and secondly there are fluctuations in the regeneration agent amount trailing across the weir in dependence upon the surface tension between the weir material and the regeneration fluid.

The two above-mentioned problems have resulted in a series of alternative methods. Thus, DE 26 44 759 A1 describes a simple water softener, in which a piston is moved by the water pressure and valves are opened and respectively closed in certain piston positions. At the same time the volume generated by the piston displacement in the guiding cylinder represents the feeding water volume and thus eventually the volume of the regeneration agent. In this connection the total allotted volume is delivered with one single stroke which necessitates a large cylinder volume.

A similar device, in which not the feeding water, but the regeneration agent directly is metered by the piston stroke, is described in DE 26 52 113 C2. In both cases a feeding with fresh water defined in terms of volume is not provided.

In contrast thereto, the initially cited DE 26 55 374 A1 describes a feeding water dosage controlled by a magnetic valve, wherein the volume control of the feeding water for the brine is performed by means of piston stroke. In the case of the known device, however, no valve control functions are provided, merely the allotting of fresh water into the brine supply container is effected.

All above-mentioned alternative devices and methods have in common that complicated regeneration methods with reduced salting, i.e. brine dilution and rewash function as well as four regenerations each day, as requested by the German Standard DIN 19636, cannot be realised. The cylinder volume, generated by the piston displacement, must also be sufficiently large such that it corresponds to the total volume of regeneration agent. A settable regeneration agent volume is realised in none of the solutions suggested in prior art and would be feasible at best by a further development of the device known from DE 26 55 374 A1, which however does not give any suggestions for a solution of the problem of valve control.

SUMMARY OF THE INVENTION

It is thus the object of the present invention to provide a device for the treatment of water of the initially mentioned type which is as simple and compact as possible and in which on the one hand an exact allotting of the feeding water for the regeneration agent reservoir can be performed and on the other hand also the valve control functions can be program-controlled without any expensive electrical or mechanical means.

This object is achieved according to the invention in that the piston carries at one of its axial ends, preferably at the end facing away from the pressure area, a connecting rod which extends in an axial direction and engages tangentially in a toothed wheel and can turn the latter by a certain angle α defined by the piston stroke and the number of teeth of the toothed wheel in a fixed constant direction of rotation, wherein the toothed wheel drives a mechanical valve control element with a cyclic control program course, like for example a camshaft, a cam plate or the like.

With the device according to the invention, the water power which drives the piston of the metering means for allotting the feeding water, is used at the same time for the drive of a program control for the different valves of the water treatment plant in a very elegant manner and by technically very simple and very inexpensive means. An already existent metering means can be retrofitted without any problems by providing a connecting rod on the lifting piston and a correspondingly modified lid of the cylinder housing at the side of the rod. Thus, in addition to an exact measuring of the feeding water in terms of volume for the supply container for providing a regeneration agent solution, a stepping motor which can be cycled gradually according to desire is provided at the same time, for controlling the opening and/or closing processes of the valves present in the plant. Thus, with very simple means and in a compact form, the problem of an exact metering of the liquid volumes is solved at the same time with the problem of an exact program control. A voltage source for a relatively expensive and usually sensitive electromotor for driving the valve control is no longer required in the solution according to the invention.

The device according to the invention is preferably operated such that pressurized water is introduced into the pressure area within the cylinder via a driving water connection, which presses the piston against the spring force into the direction of the spring-sided cylinder chamber. When the piston has reached its maximum stroke, the driving water connection is closed and the water in the cylinder is forced out of the cylinder through a corresponding outlet duct and into the supply container owing to the piston which is pushed back by the spring in the opposite direction into its resting position. The operational speed of the valve control program thus depends on the cycle frequency of the driving water supply and driving water outlet as well as on the number of teeth of the toothed wheel to be driven, which are associated to a complete program course for a valve control program.

The driving water forced out of the cylinder after the pushing action, the volume of which is determined by the cross-section of the cylinder and by the length of the piston stroke with each pushing action, defines via the number of teeth of the driven toothed wheel for one rotation of the latter, i.e. in a run of the entire control program and respectively an integer multiple thereof, an exact water volume in each case which is considerably larger than the cylinder volume of the driving cylinder. This water volume is used for the metered fresh water feeding into the regeneration agent supply container of the water treatment plant and leads in this manner to a very exact and defined dosing of the provided regeneration agent solution.

In the case of a particularly preferred embodiment of the water treatment device according to the invention, the volume of the supply container, in particular the volume of the regeneration agent supply, is larger than the volume of the cylinder, preferably an integer multiple of the cylinder volume. Owing thereto the control head of the plant can be produced in a particularly compact and thus inexpensive manner.

In the case of a preferred embodiment, the maximum length of the piston stroke path can be set. In particular with very simple embodiments, the piston stroke path can be adjusted in the range of between one and two tooth distances of the toothed wheel without any additional devices being required, such that the regeneration agent volume can be varied by a factor of almost 2.

A variation range for the setting of the maximum piston stroke path which is considerably larger and is almost unlimited in fact, with a corresponding construction of the metering device, results in one embodiment in which the connecting rod comprises at least on one part of its axial length an outer thread, wherein the outer thread is provided with an adjusting nut which, when the connecting rod is inserted in the cylinder, strikes a stopper which is rigidly connected to the cylinder. In this manner the length of the fluid delivered with each piston stroke can be set gradually at any value.

This is also made possible in a further embodiment in which the pressure area of the cylinder is closed off by a rear wall against the outer atmosphere, wherein the rear wall is provided preferably in the axial extension of the connecting rod with a continuous screw thread into which engages an adjusting screw against which, when it is screwed in, the piston strikes when the connecting rod is inserted in the cylinder. An advantage of this embodiment is the increased convenience of adjustment on the side of the metering device which faces away from the connecting rod and is better accessible.

In the case of a further development of this embodiment, sealing means, in particular an O-ring seal, are provided between the screw thread and the adjusting screw, which seal the pressure area off against the outer atmosphere. In this way it is made sure that pressurized water does not leak through the thread windings of the adjusting screw to the outside into the environment.

In the case of a further embodiment, a cylinder chamber located on the side of the spring and containing the piston, is separated from the pressure area in a water-tight manner by means of a diaphragm which contains in particular rubber or a different elastomeric material and is preferably a rolling diaphragm. In this way neither the readjusting spring nor the connecting rod come in contact with the driving water such that no problems with corrosion can occur. Furthermore, in this manner the connecting rod does not have to be sealed off against the atmosphere.

Instead of the described diaphragm seal, in a further embodiment a cylinder chamber located on the side of the spring and partly receiving the connecting rod is separated from the pressure area in a water-tight manner by means of an O-ring seal which is provided between the piston and the inner wall of the cylinder. An O-ring seal of this type is usually more easy to produce mechanically and thus less expensive. The increased friction, caused by the O-ring seal, when the piston moves in an axial direction is not important in this case, since the increased energy requirements are derived from the potential energy of the pressurized water in the pressure area.

In an embodiment a 3-way valve is provided which can preferably be controlled in an electrical or magnetic manner and in which terminate a supply and outlet duct for the water flowing in the pressure area of the cylinder, a pressurized water supply duct as well as a waste water outlet duct which terminates in the supply container. By means of the 3-way valve firstly the supply duct of the driving water to the cylinder is opened and the outlet duct is closed at the same time, whereby the piston is moved against the spring and the connecting rod of the piston turns the toothed wheel. A control which determines the cycle frequency closes the driving water supply duct and at the same time opens the outlet duct such that the spring can push the piston back into its resting position and displace the driving water from the cylinder.

In the case of a further embodiment an inexpensive 2-way valve is provided which is also preferably controlled in an electrical or magnetic manner and in which terminate on the one hand the pressurized water supply duct, and on the other hand the supply duct for the water flowing into the pressure area of the cylinder.

In this embodiment furthermore a normally constantly opened throttle organ, preferably a throttle nozzle, is disposed in a separate outlet duct for the water flowing from the pressure area into the supply container, which organ effects that besides the defined piston stroke volume additionally a defined waste water amount flows permanently into the supply container with each piston stroke.

In a preferred construction of this embodiment a pressure reducer is provided in the pressurized water supply duct or in the supply duct for the water flowing into the pressure area, which defines the water pressure of the driving water. In this way it is ensured that independently of the actual water pressure in the duct an exactly defined waste water amount flows with each piston stroke via the throttle organ into the supply container.

In the case of a preferred embodiment of the device according to the invention the cylinder chamber, which is separated from the pressure area in a water-tight manner, is sealed off with respect to the environment of the delivery body. Furthermore, a connecting duct is provided which terminates on the one hand in the cylinder chamber and on the other hand after a branching point in a suction duct which is in connection with the regeneration agent solution supply in the supply container and also in a duct which again terminates in a provision chamber which is separated within the supply container and in which the currently required volume of regeneration agent solution is provided. In this embodiment the suction duct is provided with a non-return valve which opens in the direction of the sucked regeneration agent solution flow and the duct leading to the provision chamber is provided with a further return valve which opens in the direction of the flow flowing into the provision chamber. When readjusting the piston thus regeneration agent solution can be sucked from the supply container and during the pushing action of the piston said exactly defined volume of regeneration agent liquid can be pumped in the provision chamber. In this way the feeding water as well as the currently provided regeneration agent liquid can alternately be delivered and exactly metered in each case.

In the case of a preferred embodiment of the water treatment device according to the invention, the mechanical valve control element comprises a ceramic disc pair with integrated control valves in the form of defined passages with sharp edges. Owing to the combination of control element and control valves, the entire plant becomes more compact and more resistent to disturbances during the mechanical operation since additional parts like camshaft or cam plate are omitted.

The invention also comprises of a device for driving a mechanical valve control element with a cyclic control program course for use in water treatment devices with regeneratable means for the treatment of water, in which the valve control element, in particular a camshaft, a cam plate or a ceramic disc pair with integrated control valves can have the form of defined passages with sharp edges, wherein the valve control element is driven by a toothed wheel at the teeth of which a connecting rod, which is connected with a lifting piston driven by pressurized water, engages tangentially via a catch such that the toothed wheel is rotated with each piston stroke by a certain angle $\alpha$ defined by the piston stroke path and the amount of teeth of the toothed wheel in always the same direction of rotation.

In an advantageous embodiment a further catch is provided which engages tangentially on the circumference of the toothed wheel at a different point than the first catch which is connected with the connecting rod, in such a manner that a turning back of the toothed wheel is impossible.

Advantageous is also an embodiment of the devices according to the invention in which the teeth of the toothed wheel are formed as serrations such that a sliding back of the engaging catch in a direction opposite to the direction of rotation of the toothed wheel is safely prevented.

In a particularly preferred embodiment of the devices according to the invention, the circumference of the toothed wheel is provided with a catch guidance against which a catch provided at the end of the connecting rod which faces away from the cylinder, is slightly pretensioned such that the catch, when the connecting rod is being extended from the cylinder, presses firstly against the catch guidance and after the moving over of the catch guidance engages in the next reachable space between two teeth of the toothed wheel. Independent of the return lifting path of the piston when the connecting rod moves back into the cylinder, it can be ensured by the catch guidance that the catch in the following pushing action always engages only in the next following space between two teeth of the toothed wheel. In this way the piston lifting path can be increased almost arbitrarily while the metering accuracy of the metering device remains the same.

The above-mentioned devices according to the invention may be used in an advantageous manner in softening, neutralization, deferrization or demanganization plants.

Within the scope of the invention is also a method for the operation of a device with a settable maximum piston stroke path of the above-described type, in which the volume amount of regeneration agent solution to be provided for the regeneration of the means for water treatment is determined in dependence upon the total hardness of the water volume to be treated in one operational cycle and in which, with a constant number of piston strokes for each regeneration process, the volume amount of regeneration agent solution delivered by the lifting piston driven by pressurized water is brought into correspondence with the determined volume amount by correspondingly setting the maximum piston stroke path.

In this manner the allotted regeneration agent amount can be set independently of the current hardness of the water to be treated and with a constant water volume for each operational cycle such that on the one hand the ion exchanger material is completely regenerated and on the other hand no excess regeneration agent is wasted.

In a particularly advantageous variant of this method the volume of the water to be treated in one operational cycle before the start of the following regeneration process is determined as a multiple $2^n$. X of a minimum water volume X before the start of the operational cycle, wherein n may be 0, 1, 2, 3 . . . , and wherein with an increasing total hardness of the water to be treated smaller multiples $2^n$. X are selected. The regeneration of the softening plant is thus started after fixed presettable water volumes have been flowing through the plant, wherein these water volumes relate to one another like 1 X liters to 2 X liters to 4 X liters etc. of a minimum amount X. The piston stroke path required for providing a sufficient amount of regeneration agent lies within appropriate boundaries also with particularly hard water to be treated, since with an increased hardness of the water to be treated, the water volume treated in one operational cycle can be correspondingly reduced. The setting of a maximum treatable water volume, for example 4 X liters is admissible only in a hardness range of between Y and 2 Y, whereas for a hardness range of 2 Y+1 to 4 Y half the water volume, i.e. for example 2 X liters has to be selected. In this manner devices according to the invention of identical size can be used for all feasible hardness ranges of the water to be treated.

From DE 35 06 042 A1 a method for the control of water treatment plants is already known in which also the amount of regeneration agent is varied in dependence upon an outer influencing variable. In this method not the actual total hardness of the water to be treated is taken as a basis for selecting the regeneration agent means, but merely the volume of the water to be treated is measured and the regeneration of the ion exchanger is initiated when a preset volume value is reached. If the water to be treated is comparatively soft, this leads to a waste of relatively large amounts of regeneration agents, whereas with particularly hard water, the regeneration is initiated too late such that in the meantime a breaking-through of hard water through the ion exchanger has occurred.

The invention is described and explained in the following on the basis of the embodiments shown in the drawing. The features which can be deduced from the description and drawing may be applied in other embodiments of the invention individually, by themselves or in any combination with one another.

DETAILED DESCRIPTION

Figure 1:
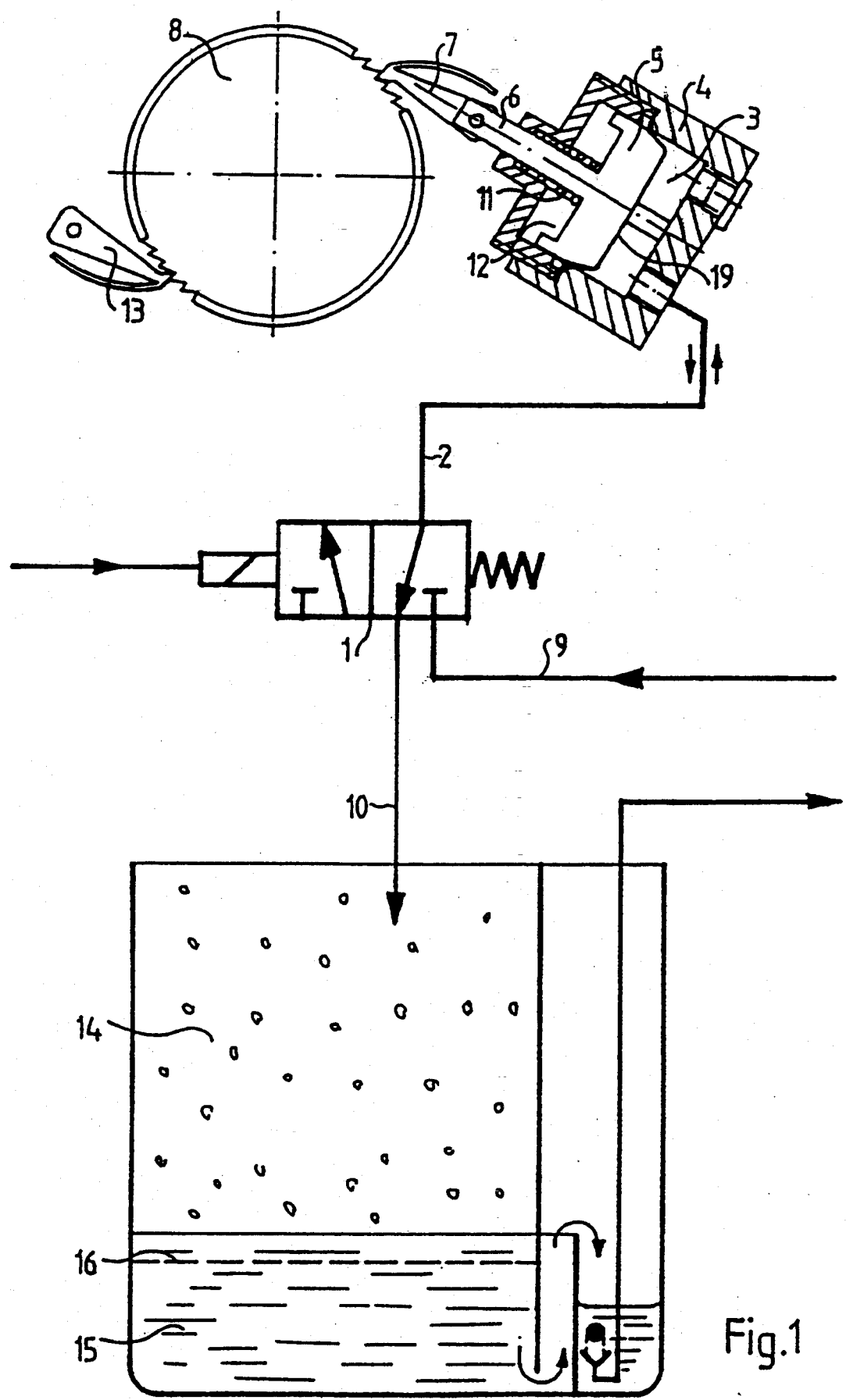
FIG. 1 shows a schematic functional diagram of the inventional plant according to example 1.
Figure 2:
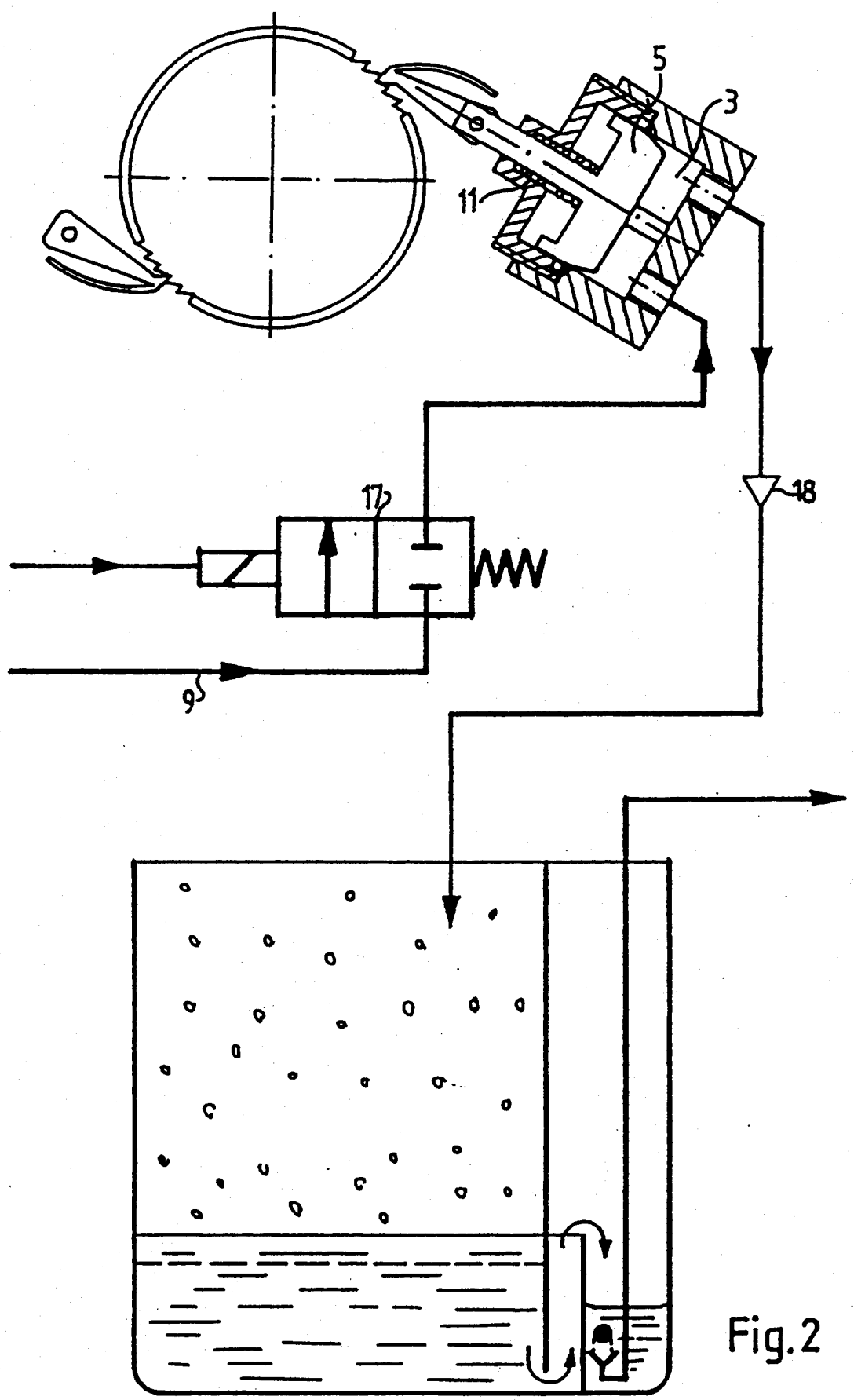
FIG. 2 shows a schematic functional diagram of an inventional plant according to example 2.
Figure 3:
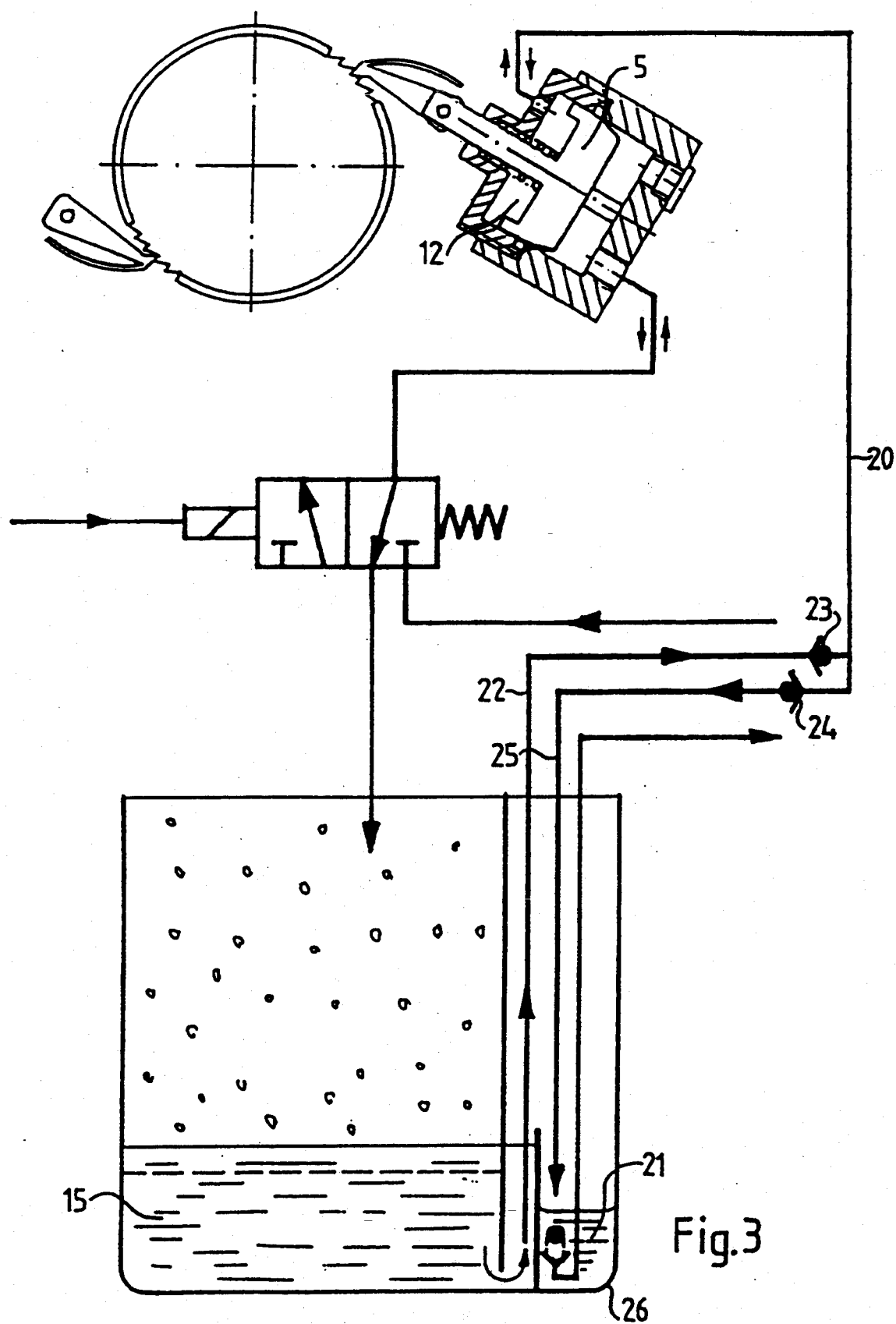
FIG. 3 shows a schematic functional diagram of an inventional plant according to example 3.

The present invention pertains to two partial areas which are independent of one another with respect to function and which cooperate technically with respect to the success aimed at in a simple and compact plant. The first partial area is a drive, which uses the water pressure in a water pipe as an energy source for the drive of a valve control program which is determined on a camshaft, a cam plate or in ceramic discs. The pressurized water from the pipe is guided via a shortly opened (magnetic) valve 1, 17 into a cylinder 4. Therein it displaces a piston 5 which carries a connecting rod 6 at its end facing away from the pressurized water. Said connecting rod 6 engages tangentially in a toothed wheel 8 wherein the longitudinal movement is transferred to a rotational movement by which the valve control program is driven. If the piston 5 and thus also the connecting rod 6 have taken their maximum path of displacement, the pressurized water valve is closed and a spring 11 forces the piston 5 into its initial position, wherein the water in the cylinder 4 can flow out via an opened valve or a permanently opened throttle. In this manner the toothed wheel 8 is turned by 360° after a number of strokes which depends on the number of teeth. The turning angle α for each stroke is thus 360° number of teeth. Thus this simple and inexpensive construction realises the function of a stepping motor. The control of the pressurized water valve can be effected electronically in a very simple manner.

The second partial area of the present invention solves the problem of providing a precise regeneration agent volume. The latter can be realised with the above-described drive mechanism in a very exact and almost cost-neutral manner by selecting the volume of the driving water (i.e. the waste water) in such a manner that it corresponds to the required feeding water volume. The water volume displaced from the cylinder by the piston 5 when it moves into its resting position is conveyed into the brine supply container 14. Therein, it dissolves the regeneration salt and then is available as exactly metered regeneration agent.

The precise measuring of the required volume can be realised easily via the cylinder diameter, the maximum piston stroke path which is preferably variable and via the number of teeth of the toothed wheel 8 for each regeneration process, i.e. via the number of strokes of the piston 5. The maximum piston stroke path is the only quantity which can be changed even afterwards and without any further measures in that the length of the piston stroke can be varied from one distance between two teeth to two distances between neighbouring teeth in order to turn the toothed wheel 8 during one stroke by only one tooth respectively.

EXAMPLE 1

FIG. 1

The first example is an especially advantageous embodiment. Pressurized water is delivered via a 3-way valve 1 which is controlled by an electronic control system, and via a duct 2 from a pressurized water supply 9 from the water network into the pressure area 3 of a cylinder formed by the casing 4. In this way a piston 5 which is sealed off from the pressure area 3 by means of a diaphragm 19 and carries a connecting rod 6 on its side facing away from the pressure area 3, is displaced in the direction of the connecting rod. The connecting rod engages with its catch 7 tangentially in a toothed wheel 8 and rotates it by an angle $\alpha = 360°/$number of teeth. In this very simple and elegant manner the linear piston movement is changed into a rotational movement by means of which a camshaft, a cam plate, a ceramic disc pair etc. can be driven. If the piston 5 has taken its climax position, a 3-way valve 1 closes the pressurized water supply 9 and opens the water outlet 10. In this way the pressure in the pressure area 3 falls and a spring 11 in the cylinder chamber 12 which is located on the side of the spring and is not sealed off against the environment, pushes the piston 5 back into its resting position. The water in the pressure area 3 is thus carried away via the duct 2, the 3-way valve 1 and the water duct 10. Thereby, the catch 7 returns and engages into the next tooth of the toothed wheel 8. A further catch 13 prevents a turning back of the toothed wheel 8.

If this drive device is used for driving the valve control program of an ion exchanger in which necessarily a certain amount of regeneration brine for each regeneration process has to be prepared on the one hand and to be provided on the other hand, the water flowing away from the piston via the duct 10 is supplied via a salt supply 14 to a brine supply 15 which is separated from the salt supply by a sieve plate 16. In this way a certain water volume, which is exactly defined by the piston stroke and the cross-section of the piston, is generated in each stroke, i.e. for each turning angle $\alpha$ of the toothed wheel (360°/number of teeth). The piston system can meter via the lifting volume and the number of strokes necessary for carrying out a regeneration process, the amount of feeding water required for the preparation of regeneration brine in an exact manner and supply it to the salt container.

EXAMPLE 2

FIG. 2

The second example corresponds to the first example with the difference that the relatively expensive 3-way valve 1 is replaced by a considerably less expensive 2-way s valve 17. In order to allow the pressurized water to flow away after closing the 2-way s valve 17, a forced opening has to be produced by means of a throttle nozzle 18 through which during the resetting of the piston 5 which was readjusted into its resting position by the spring 11, the pressurized water introduced in the cylinder is removed as waste water from the pressure area 3. While the valve 17 is opened, the throttle nozzle 18 is also opened. Thus, a certain amount of water always flows away unused. However, this is only a few milliliters per stroke. This arrangement becomes critical only if the waste water is to be used for the volume-true dosage of feeding water. In that case, it is necessary to define the pipe water pressure via a pressure reducer not shown in the drawing such that with a defined throttle nozzle cross-section and a defined opening time of the valve 17 again an exactly defined waste water amount is generated for each stroke.

EXAMPLE 3

FIG. 3

The third example differs from the first example in that the spring-sided cylinder chamber 12 is sealed off against the environment and comprises of a connecting duct 20 to the brine supply 15 and to the prepared regeneration brine 21, respectively. During the readjusting of the piston 5 an exact amount of brine is sucked via a suction duct 22 and a non-return valve 23 from the brine supply 15, and is again displaced from the cylinder chamber 12 in the next stroke and delivered into a provision chamber 26, for the regeneration brine to be provided, via the connecting duct 20, a further non-return valve 24 and a duct 25. Thus, with one pumping action the valve control program is rotated by a certain angle and also a defined fraction of the feed-water volume required for the brine preparation for a regeneration is delivered and also a defined fraction of the regeneration brine volume required for a regeneration is delivered from the brine supply 15 to the provision chamber 26.

During operation of a softening plant the regeneration intervals depend either on the time (regeneration once a week for example) or with modern plants on the treated amount of water. The latter is certainly the better solution for reasons of protection of the environment (regeneration based on consumption). In addition to the amount of water flown through the plant, however, also the quality of the water to be treated must be taken into consideration, i.e. the concentration of the hardening constituents calcium (Ca) and magnesium (Mg) contained in the water. The concentration of these hardening constituents is usually comprised in a sum parameter called total hardness. If this total hardness is multiplied with the water volume treated between two regenerations, the total amount of calcium and magnesium is obtained which can be removed from the water to be treated between two regenerations by the softening plant.

The above-mentioned total amount of water depends on the way of operation, on the amount of ion exchanger resin used, on the regeneration agent use factor and on the regeneration agent amount used. Since the adjustment of the regeneration agent amount for each regeneration can be relatively inexact in small plants and for small regeneration agent amounts, softening plants in domestic water technology are usually regenerated with a constant regeneration agent amount for each regeneration and this independently of the total hardness of the water to be treated. Thus, the amount of treated water monitored by a water meter must be chosen smaller for the case of relatively high total hardness than for a relatively small total hardness of the treated water. In the installation of such a softening plant the regeneration release must therefore be set in dependence upon the local total hardness corresponding to the maximum possible amount of water which can be treated with the present total hardness.

As a surprise the above described invention discloses completely new possibilities:

With the volume-true feeding of the fresh water for the preparation of brine according to the invention, a method and a device are provided in a surprising and also simple manner, by means of which a regeneration agent amount which depends on the total hardness of the water to be treated, can be prepared. It is no longer necessary to adjust the maximum amount of water to be treated in dependence upon the total water hardness (this can be done to a relative precise degree, however involves a considerable electronic or mechanical effort), but the regeneration agent requirement is adjusted to the water hardness for each operational cycle, between two regenerations with a constant treated water volume.

It is already described above, that the maximum piston stroke path of the piston 5 is settable, in particular in the range between one and two tooth distances of the toothed wheel 8. This slight variation possibility which exists without further constructive measures is to serve in particular for the fine adjustment and for the compensation of production tolerances with respect to the exact pumping volume.

The invention presented herein, goes much further. By means of a simple catch guidance 27, it can be achieved that the catch 7 engages always only in the next possible space between two teeth of the toothed wheel 8 with each stroke. Thereby the possibility arises that the piston stroke path can be varied almost arbitrarily. The piston-swept volume of this pump can be adjusted in a simple manner between the minimum length of the piston stroke path required for the toothed wheel drive and the maximum piston stroke path limited by the cylinder length and can thus be varied. Since the number of strokes for each regeneration cycle is constant, the feed-water volume delivered with each regeneration cycle can be gradually adjusted and precisely allotted.

EXAMPLE 4

Figure 4A:
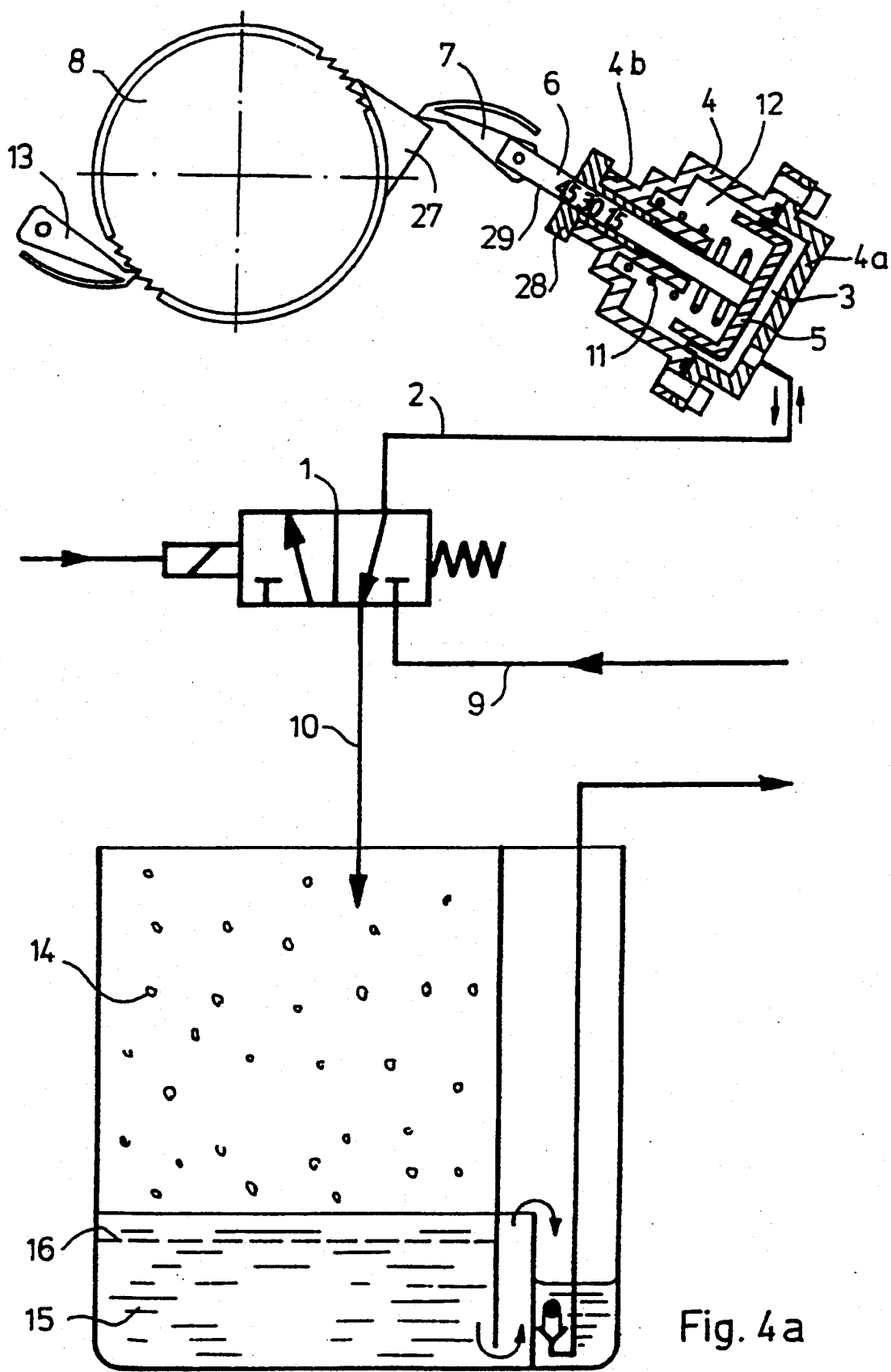
FIGS. 4a–c show a schematic functional diagram of an inventional plant according to example 4.
Figure 4B:
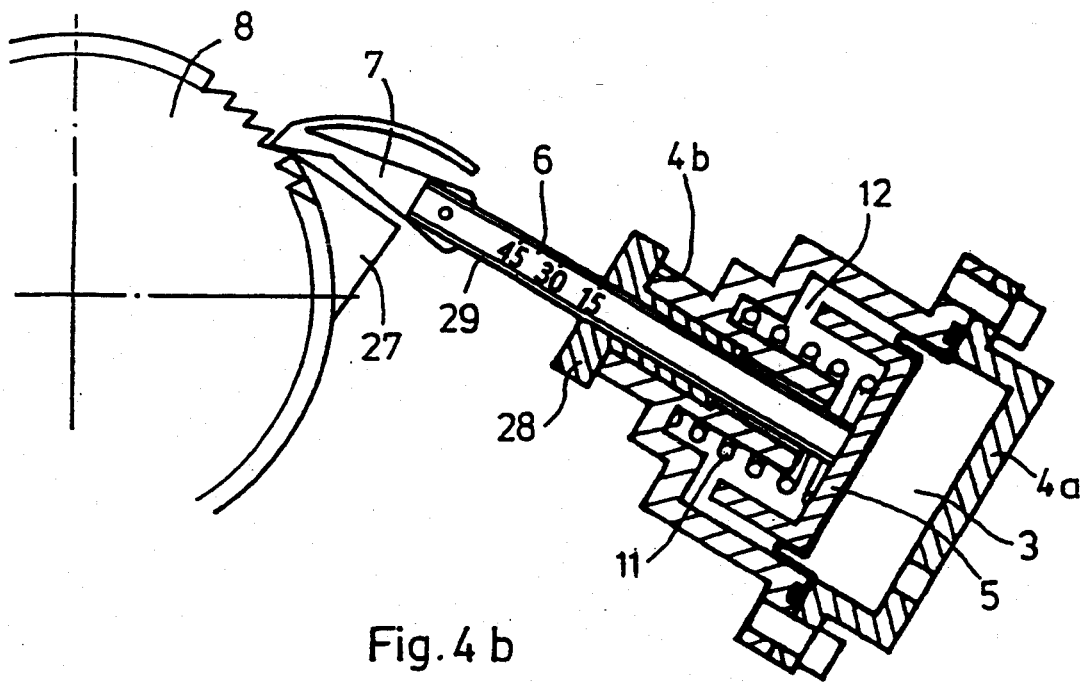
Figure 4C:
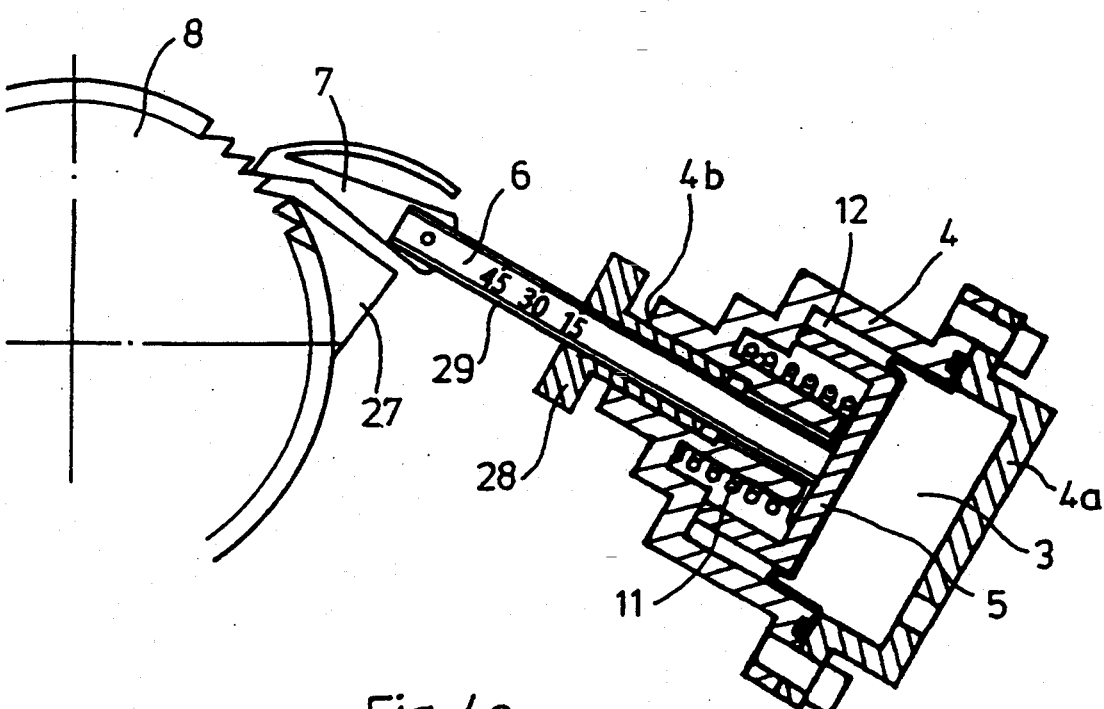
Figure 5:
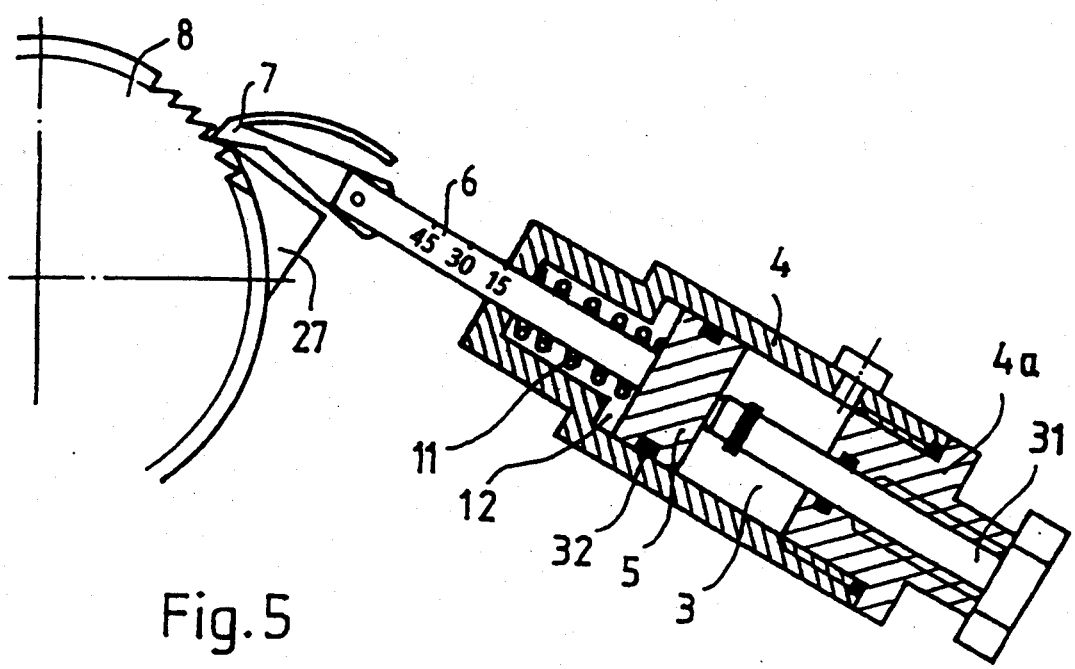
FIG. 5 shows a schematic longitudinal section through an inventional metering device according to example 5.

FIGS. 4a-4c

FIG. 4a shows such a piston drive with feed-water metering, the stroke volume of which and thus the feed-water volume can be set by an adjusting nut 28 on an outer thread 29 provided on the connecting rod 6. In the present example the adjusting nut 28 is set to the FIG. 45 (this corresponds to a water hardness of 45°dH=800 ppm). Thereby the piston 5 can return in its resting position almost to the rear wall 4a of the cylinder casing, when the adjusting nut 28 strikes a stopper 4b rigidly connected to the cylinder 4 owing to the restoring force of the spring 11. If the magnetic valve 1 establishes the connection between the pressure area 3 and the pressurized water duct, the water flows via the duct 2 into the pressure area 3 and presses the piston 5 against the spring force into the direction of the toothed wheel 8. The catch guidance 27 causes the catch 7 to engage tangentially in the toothed wheel 8 in a defined manner such that with each pushing movement only the following space between two teeth is engaged and the toothed wheel is rotated by the corresponding turning angle.

The feed-water volume delivered from the pressure area 3 into the salt supply container 14 when switching the magnetic valve 1 is by nature dependent on the piston-swept volume of the drive element. This means that the further the piston can retreat in order to reach its resting position, the larger is the feed-water volume delivered in each drive stroke.

FIGS. 4b and 4c show this drive and feed-water metering unit again on an enlarged scale and with an adjusting nut 28 set at 15 (for a water hardness of 15° dH). FIG. 4b shows that with this setting, the return stroke path into the resting position is considerably shorter than with a setting of 45. Correspondingly, the lifting volume between the resting position shown in FIG. 4b and the maximum pushing position shown in FIG. 4c, is correspondingly smaller. Thus, for each stroke, a correspondingly smaller feed-water volume is allotted into the salt supply container 14.

By means of this device it is possible in a simple manner to set and respectively preset the regeneration agent amount for each regeneration via the adjustable feed-water volume, in order to be able to treat a constant water volume for each regeneration independently of the local water hardness.

EXAMPLE 5

FIG. 5

In an embodiment alternative to examples 1 to 4, the sealing off of the pressure room 3 to the side of the connecting rod is not realised by means of a rubber diaphragm 30 (preferred in this case is a so-called rolling diaphragm) but the piston 5 is sealed off against the cylindrical inner wall of the casing 4 by means of one or several O-rings.

EXAMPLE 6

FIG. 6

Figure 6:
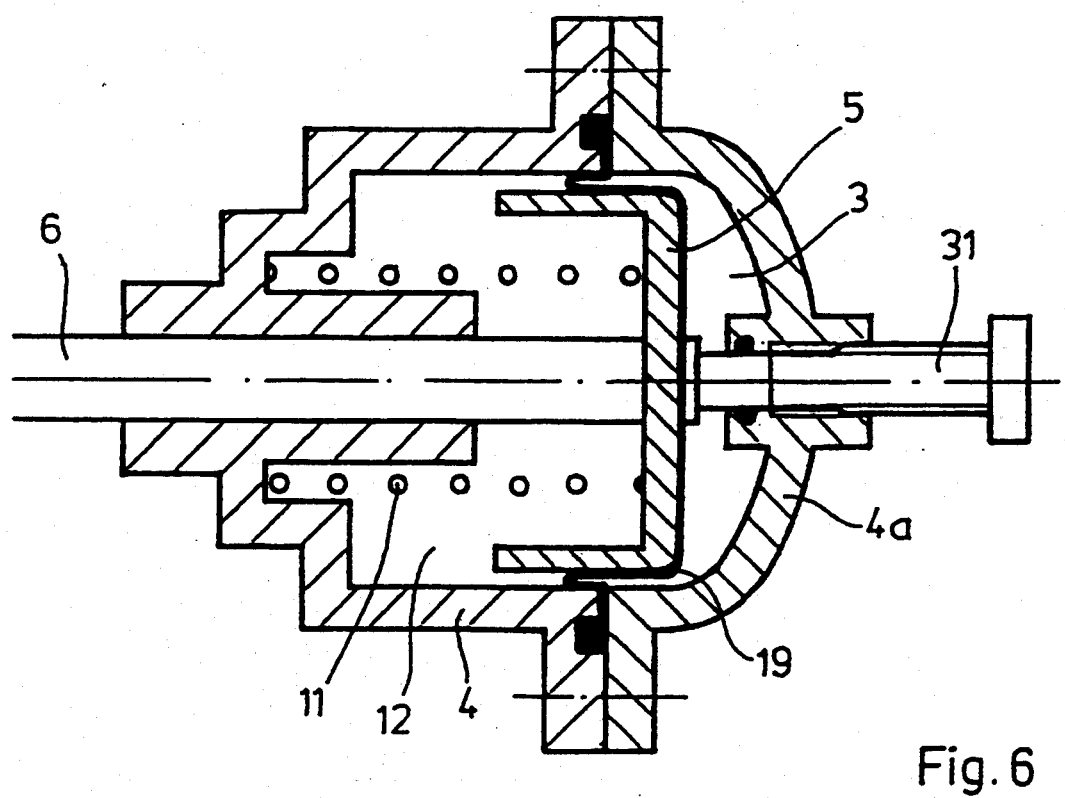
FIG. 6 shows a schematic longitudinal section through an inventional metering device according to example 6.

Corresponding to FIG. 6, the resting position of the piston 5 can also be set by means of an adjusting screw 31 integrated in the casing rear wall 4a on the pressure side. The advantage of this variant is to be regarded the more comfortable possibility of adjustment. A disadvantage, however, is the required sealing off of the adjusting screw between the pressure room 3 and the environment.

The maximum possible piston-swept volume has to be dimensioned such that also with the biggest admissible water hardness a sufficient amount of regeneration agent can be produced (via the metered feed-water volume). According to practice, at a water hardness of 45° dH (45° German total hardness) 4 to 5 times the regeneration agent amount has to be produced with a constant product water amount as at 15° dH. This means of course also a corresponding variation of the piston-swept volume by the factor 4 to 5. In this way the volume of the drive and metering device can become very large since it has to be designed for the largest volume to be delivered. This leads to higher production costs.

EXAMPLE 7

A particularly advantageous embodiment therefore consists of a water meter with associated electronics, which effects the regeneration of the hardening plant after X liters or 2 X liters in a preselectable manner. 2 X liters of water can be treated at a total hardness of for example 12°–24° dH. The piston stroke has to be varied in this case only by the factor 2 to 2.5 of the minimum (12° dH) to the maximum (24° dH) piston-swept volume.

X liters of water (exactly half the amount) can be treated if the total hardness lies within the range of 25 to 48° dH. At 25° dH the piston stroke is set at the same stroke path as before at 24° dH and at 48° dH to the maximum stroke preset at 24° dH. For intermediate values it is corresponding. In this way the required maximum lifting volume can be halved. In the hardness range of up to 24° dH for example, the total product water amount can be treated between two regenerations, and only in the case of extremely hard water of 25° dH to 48° dH the product water amount is halved, i.e., regeneration is required more frequently.

In general, the volume of the water to be treated for each operational cycle is selected as multiple $2^n X$ of a minimum water volume X, wherein n may be 0, 1, 2, 3 . . . .

For the above mentioned water hardness the substance concentration of the alkaline earth ions is used for each kg (mmol/kg). One degree of German hardness (°dH) corresponds to 0.1785 mmol alkaline earth ions for each kg. One distinguishes also French (°fH), English (°eH) and American hardness (ppm = 1 part per million). The converting factors can be deduced from the following table:

|          | mmol/kg | °dH   | °fH  | °eH  | ppm   |
|----------|---------|-------|------|------|-------|
| 1 mmol/kg| 1,0     | 5,6   | 10,0 | 7,0  | 100,0 |
| 1° dH    | 0,1785  | 1,0   | 1,79 | 1,25 | 17,9  |
| 1° fH    | 0,1     | 0,56  | 1,0  | 0,7  | 10,0  |
| 1° eH    | 0,143   | 0,8   | 1,43 | 1,0  | 14,3  |
| ppm      | 0,01    | 0,056 | 0,1  | 0,07 | 1,0   |

We claim:

1. An ion exchanger device for the treatment of domestic water, the device comprising: an ion exchanger material for exchanging ions in water; a supply container adapted for providing a regeneration agent solution for the regeneration of the ion exchanger material; the supply container having a predetermined volume; a piston-stroke controlled metering device adapted for allotting feed-water into the supply container, the metering device comprising a hollow cylindrical body having a volume which is smaller than the predetermined volume of the supply container, the cylindrical body also having a piston which is axially displaceable therein, the piston having one axial surface facing a pressure space within the cylindrical body, the piston being adapted to be acted on by water pressure of at least one of water to be treated and water which has already been treated, the piston being urged in a direction towards the pressure space by a spring means; means for feeding a water volume, displaced by a piston stroke, from the cylindrical body to the supply container; a connecting rod connected to an axial end of the piston and extending in an axial direction; a toothed wheel having a predetermined number of teeth and adapted to be engaged tangentially by the connecting rod and to be turned in a fixed constant direction of rotation through a certain angle defined by a piston stroke and he number of teeth of the toothed wheel; and a mechanical valve control element adapted to be driven by the toothed wheel.

2. Device according to claim 1 including means for setting the maximum length of the piston stroke path.

3. Device according to claim 1, wherein the mechanical valve control element comprises a ceramic disc pair with integrated control valves in the form of defined openings with sharp edges.

4. Device according to claim 1, wherein the volume of the supply container for the regeneration agent solution is an integral multiple of the volume of the cylindrical body.

5. Device according to claim 1 wherein the teeth of the toothed wheel are formed as serrations.

6. A device according to claim 1, wherein the supply container comprises a brine supply container, the spring means comprises a helical spring positioned on a side axially opposite to the pressure space and supported against an end-faced inner wall of the cylindrical body, and the connecting rod is connected to an axial end of the piston facing away from the pressure space.

7. A device according to claim 1, wherein the connecting rod has at least one portion formed with an external thread, the device comprising an adjusting nut received on said portion and adjustably movable along the external thread, and a stopper rigidly connected to the cylindrical body for engagement by the adjusting nut to limit the stroke of the piston.

8. A device according to claim 1, in which the cylindrical body includes a rear wall for closing the pressure space in the body against the outer atmosphere, the connecting rod having an extension projecting rearwardly from the piston, the rear wall having an opening aligned axially with the extension and formed with a continuous internal screw thread, the device including a tubular adjusting screw having a continuous external thread adjustably engaging the internal thread inside the opening, the extension being slidably received in the tubular adjusting screw, the piston being engageable with the adjusting screw for limiting the stroke of the piston.

9. A device according to claim 8, including sealing means received between the internal screw thread and the adjusting screw for sealing the pressure space against the outer atmosphere.

10. A device according to claim 9, wherein the cylindrical body comprises a cylinder chamber located on the connecting rod side of the piston and containing the spring means and sealed from the pressure space in a water-tight manner by means of a diaphragm which contains rubber; a portion of the connecting rod being movably received in the cylinder chamber; means including an O-ring seal disposed between the connecting rod and the cylindrical body for sealing the cylinder chamber against the outer atmosphere; a power operable 3-way valve means; a supply and outlet duct connected between the valve means and the pressure space of the cylindrical body; a water supply duct connected to the valve means; a waste water outlet duct connected between the valve means and the supply container; a pressure reducer connected in series with the pressure water supply duct, the valve means, and the supply and outlet duct; the supply container being provided with a provision chamber which is separated within the supply container and is adapted to hold a currently required volume of the regeneration agent solution; the device including a suction duct, a first non-return valve and a connection duct connected in series between the supply container and the cylinder chamber for use in sucking the regeneration agent solution between the supply container and the cylinder chamber; the first non-return valve being adapted to open in a direction to conduct the sucked solution from the supply container to the cylinder chamber; the device including a second non-return valve and a discharge duct connected between the connection duct and the provision chamber; the second non-return valve being adapted to open in a direction to carry the regeneration agent solution between the cylinder chamber and the provision chamber; the movement of the piston in the cylinder chamber being effective to pump the regeneration agent solution between the supply container and the provision chamber.

11. A device according to claim 1 wherein the cylindrical body includes a cylinder chamber containing the spring means, the cylinder chamber being separated from the pressure space in a water-tight manner by a diaphragm containing an elastomeric material.

12. A device according to claim 1, in which the cylindrical body is formed with an inner cylindrical wall in which the piston is slidably movable, an O-ring seal being provided between the piston and the inner cylindrical wall, the cylindrical body having a cylinder chamber in which the spring means is located, the cylinder chamber being separated from the pressure space in a water-tight manner by the O-ring seal.

13. A device according to claim 1, including a power operable 3-way valve means, a supply and outlet duct connected between the valve means and the pressure space of the cylindrical body, a water supply duct connected to the valve means, and a waste water outlet duct connected between the valve means and the supply container.

14. A device according to claim 1, including a power operable 2-way valve means, a pressurized water supply duct connected to the valve means, a water supply duct connected between the valve means and the pressure space of the cylindrical body, and an outlet duct including a throttle nozzle connected between the pressure space and the supply container for carrying a flow of water therebetween.

15. A device according to claim 14, including a pressure reducer connected in one of the ducts comprising the pressurized water supply duct connected to the valve means and the supply duct connected between the valve means and the pressure space.

16. A device according to claim 1, wherein the cylindrical body comprises a cylinder chamber located on the side of the piston containing the spring means and sealed from the pressure space in a water-tight manner; means for sealing the cylinder chamber against the outer atmosphere, the supply container being provided with a provision chamber which is separated within the supply container and is adapted to hold a currently required volume of the regeneration agent solution; the device including a suction duct, a first non-return valve and a connection duct connected in series between the supply container and the cylinder chamber for use in sucking the regeneration agent solution therebetween, the first non-return valve being adapted to open in a direction to conduct the sucked solution from the supply container to the cylinder chamber; the device including a second non-return valve and a discharge duct connected between the connection duct and the provision chamber, the second non-return valve being adapted to open in a direction to carry the regeneration agent solution between the cylinder chamber and the provision chamber, whereby the movement of the piston in the cylinder chamber pumps the regeneration agent solution between the supply container and the provision chamber.

17. A device according to claim 1, including a catch guidance disposed adjacent the toothed wheel, the connecting rod having an end portion facing away from the cylindrical body, the end portion having a catch connected thereto and engageable successively with the catch guidance and the next reachable tooth of the toothed wheel.

18. A device according to claim 17, including a non-return catch adjacent the toothed wheel and engageable tangentially therewith at a location different from the location of the connecting rod for preventing reverse rotation of the toothed wheel.

19. A device according to claim 1, wherein the valve control element comprises a ceramic disc pair with integrated control valves in the for of defined openings with sharp edges, the device comprising means connected between the toothed wheel and the ceramic disc pair for driving the ceramic disc pair, the connecting rod having a catch mounted thereon and engageable tangentially with the toothed wheel, whereby the toothed wheel is turned in a certain direction of rotation through a certain angle $\alpha$ by each stroke of the piston, the angle $\alpha$ being determined by the strobe of the piston and the number of teeth on the toothed wheel.

20. Device according to claim 19, including a non-return catch mounted adjacent the toothed wheel and engageable tangentially therewith at a location different from the location of the catch on the connecting rod for preventing reverse rotation of the toothed wheel.

21. Device according to claim 19, in which the teeth of the toothed wheel are formed as serrations.

22. Device according to claim 19, including a catch guidance mounted adjacent the toothed wheel and engageable by the catch on the connecting rod, the catch being movable by the connecting rod along the catch guidance and then into the next reachable space between two teeth of the toothed wheel.

* * * * *

UNITED STATES PATENT AND TRADEMARK OFFICE
CERTIFICATE OF CORRECTION

PATENT NO. : 5,415,767
DATED : May 16, 1995
INVENTOR(S) : Hansjorg Schuler and Ralf Socknick It is certified that error appears in the above-identified patent and that said Letters Patent is hereby corrected as shown below:

In column 13, line 47, claim 1, "he" is corrected to read --the--.

In column 16, line 23, claim 19, third line thereof, "for" is corrected to read --form--.

In column 16, line 31, claim 19, "strobe" is corrected to read --stroke--.

Signed and Sealed this

Fourth Day of July, 1995

BRUCE LEHMAN

Attest:

Attesting Officer

Commissioner of Patents and Trademarks